(12) United States Patent
Choi et al.

(10) Patent No.: US 8,837,943 B2
(45) Date of Patent: Sep. 16, 2014

(54) COMMUNICATION SYSTEM AND METHOD FOR DIRECTLY TRANSMITTING SIGNALS BETWEEN NODES OF A COMMUNICATION SYSTEM

(75) Inventors: Changsoon Choi, Munich (DE); Qing Wei, Munich (DE); Thorsten Biermann, Oberschleissheim (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/346,021

(22) Filed: Jan. 9, 2012

(65) Prior Publication Data
US 2012/0177373 A1 Jul. 12, 2012

(30) Foreign Application Priority Data

Jan. 10, 2011 (EP) ..................... 11150495

(51) Int. Cl.
*H04J 14/00* (2006.01)
*H04B 10/00* (2013.01)
*H04J 14/02* (2006.01)

(52) U.S. Cl.
CPC ......... *H04J 14/1246* (2013.01); *H04J 14/0235* (2013.01); *H04J 14/025* (2013.01)
USPC ............................................. 398/66; 398/153

(58) Field of Classification Search
CPC ........................ H04J 14/0267; H04J 14/0252
See application file for complete search history.

(56) References Cited

U.S. PATENT DOCUMENTS

| | | | |
|---|---|---|---|
| 6,826,334 B2 | 11/2004 | Yoneda | |
| 7,330,650 B2 | 2/2008 | Kim et al. | |
| 7,555,215 B2 | 6/2009 | Nakamura et al. | |
| 2004/0264492 A1* | 12/2004 | Blahut et al. | 370/442 |
| 2005/0084267 A1* | 4/2005 | Fan et al. | 398/84 |

(Continued)

FOREIGN PATENT DOCUMENTS

| | | |
|---|---|---|
| CN | 101047464 A | 10/2007 |
| EP | 1 628 423 A1 | 2/2006 |

(Continued)

OTHER PUBLICATIONS

Optical Access-Metro Network Architecture based on Passive Access and Burst-mode Transmission (published in Seventh Annual Communication Networks and Services Research Conference, pp. 47-54, May 2009).*

(Continued)

*Primary Examiner* — David Payne
*Assistant Examiner* — Casey Kretzer
(74) *Attorney, Agent, or Firm* — Brinks Gilson & Lione (57) ABSTRACT

A communication system has a plurality of nodes adapted to provide for a communication with one or more devices, a central node, a passive optical network having a multiplexer/demultiplexer device adapted to demultiplex a first optical signal from the central node to the plurality of nodes, and to multiplex second optical signals from one or more of the nodes, each node having allocated a wavelength for generating its optical signal, wherein for directly transmitting signals from one node to at least one of the other nodes, the one node is adapted to generate an optical signal at the wavelength allocated to the at least one of the other nodes, the optical signal including the signal to be transmitted, and wherein the multiplexer/demultiplexer device of the passive optical network is adapted to combine the optical signal from the one node with the first optical signal.

10 Claims, 8 Drawing Sheets

(56) References Cited

U.S. PATENT DOCUMENTS

| | | | | |
|---|---|---|---|---|
| 2005/0220129 | A1* | 10/2005 | Boyd | 370/428 |
| 2008/0019694 | A1* | 1/2008 | Song et al. | 398/72 |
| 2009/0238561 | A1* | 9/2009 | Huang et al. | 398/25 |

FOREIGN PATENT DOCUMENTS

| | | | |
|---|---|---|---|
| JP | 2003-018126 A | | 1/2003 |
| JP | 2007-079460 A | | 3/2007 |
| JP | 2010-245987 A | | 10/2010 |
| KR | 10-0520637 B1 | | 10/2005 |
| RU | 2310278 C1 | | 11/2007 |
| WO | WO 2007/086777 A1 | | 8/2007 |
| WO | WO 2010/057414 A1 | | 5/2010 |
| WO | WO 2010057414 A1 | * | 5/2010 |

OTHER PUBLICATIONS

Pfeiffer, Thomas, "Converged Heterogeneous Optical Metro-Access Networks," ECOC 2010, Torino, Sep. 2010, 31 pages.

Samardziga, Dragan et al., "Determining Backhaul Bandwidth Requirements for Network MIMO," 17 European Signal Processing Conference, Glasgow, Scotland, Aug. 24-28, 2009, pp. 1494-1498.

Sawahashi, Mamoru et al, "Coordinated Multipoint Transmission/Reception Techniques for LTE-Advanced," IEEE Wireless Communications, vol. 17, Issue 3, Jun. 2010, pp. 26-34.

Okada, K. et al., "Verification of Fullmesh WDM-PON Architecture Using Wavelength Transfer Matrix," Proceedings of the IEICE General Conference, 2006, Communication 2, pp. 442 with English translation, 4 pages.

Office Action from counterpart Japanese Application No. 2012-002018, dated May 31, 2013, 5 pages.

Office Action in corresponding Russian Application No. 2012100033/07, and English translation thereof, dated May 16, 2013, 9 pages.

Notice of Preliminary Rejection from South Korean Application No. 10-2012-0003192, dated Mar. 19, 2013, 7 pages.

Okada, Kohei et al., "Design and verification of wavelength routing function in WDM network using wavelength transfer matrix approach," Proc. of SPIE, vol. 6022, 2005, pp. 60221P-1-60221P-8.

Sakai, Tomoki et al., "Low power consumption enterprise/campus network that realizes wavelength VPN with AWG loopback connection," 2010 Photonics Global Conference (PGC), Dec. 2010, pp. 1-4.

Office Action from Canadian Application No. 2,763,864, dated Dec. 3, 2013, 3 pages.

Office Action from South Korean Application No. 10-2012-0003192, dated Oct. 31, 2013, 8 pages.

Office Action received in counterpart Chinese patent application number 201210061844.8 dated May 21, 2014, 17 pages.

\* cited by examiner

COMMUNICATION SYSTEM AND METHOD FOR DIRECTLY TRANSMITTING SIGNALS BETWEEN NODES OF A COMMUNICATION SYSTEM

RELATED APPLICATIONS

This application claims priority under 35 U.S.C. §119 to European Patent Application No. 11150495.7 filed on Jan. 10, 2011, the entire content of which is hereby incorporated by reference.

BACKGROUND OF THE INVENTION

Embodiments of the invention concern the field of communication systems, for example, mobile communication systems comprising a plurality of base stations serving respective mobile units. More specifically, embodiments of the invention refer to a communication system and a method for directly allowing a communication among respective nodes thereof, for example among respective base stations, as well as to a node or base station and an optical multiplexer/demultiplexer device of such a communication system.

In a communication system a plurality of nodes and a central switching device are coupled via a backhaul access network for exchanging signals between the nodes. However, there may be circumstances that need the exchange of information directly between the respective nodes, for example between respective base stations of a mobile communication system. For mobile communication systems, for example, coordinated multi-point (CoMP) schemes have been discussed in 3GPP (third generation partnership project) due to their potential to improve user data rates by allowing different nodes to participate in the transmission and the reception of user data. Examples of such schemes are discussed by M. Sawahashi, Y. Kishiyama, A. Morimoto, D. Nishikawa and M. Tanno, "Coordinated multipoint transmission/reception techniques for LTE-advanced," IEEE wireless communications, vol. 17, issue 3, pp. 26-34, 2010. CoMP schemes need the exchange of user data as well as the exchange of cell information, for example channel state information (CSI), through mobile backhaul networks so that the achievable performance enhancement strongly depends on the mobile backhaul capability, as is discussed by D. Samardzija and H. Huang, "Determining backhaul bandwidth requirements for networks MIMO," EUSIPCO, Glasgow, August 2009. In many cases, signal and data exchanges for a CoMP transmission are needed between neighboring nodes or base stations (eNBs), since adjacent nodes usually yield the most significant influence on interference and received signal power level of mobile users. For such a communication, the X2 interface defines a logical interface between two nodes (eNBs) and is used for exchanges/transmissions to support the CoMP transmission. The X2 interface as defined in the 3GPP standard is not a physical interface, but a logical interface which depends on the specific hardware implementation of the actual physical interface.

Figure 1:
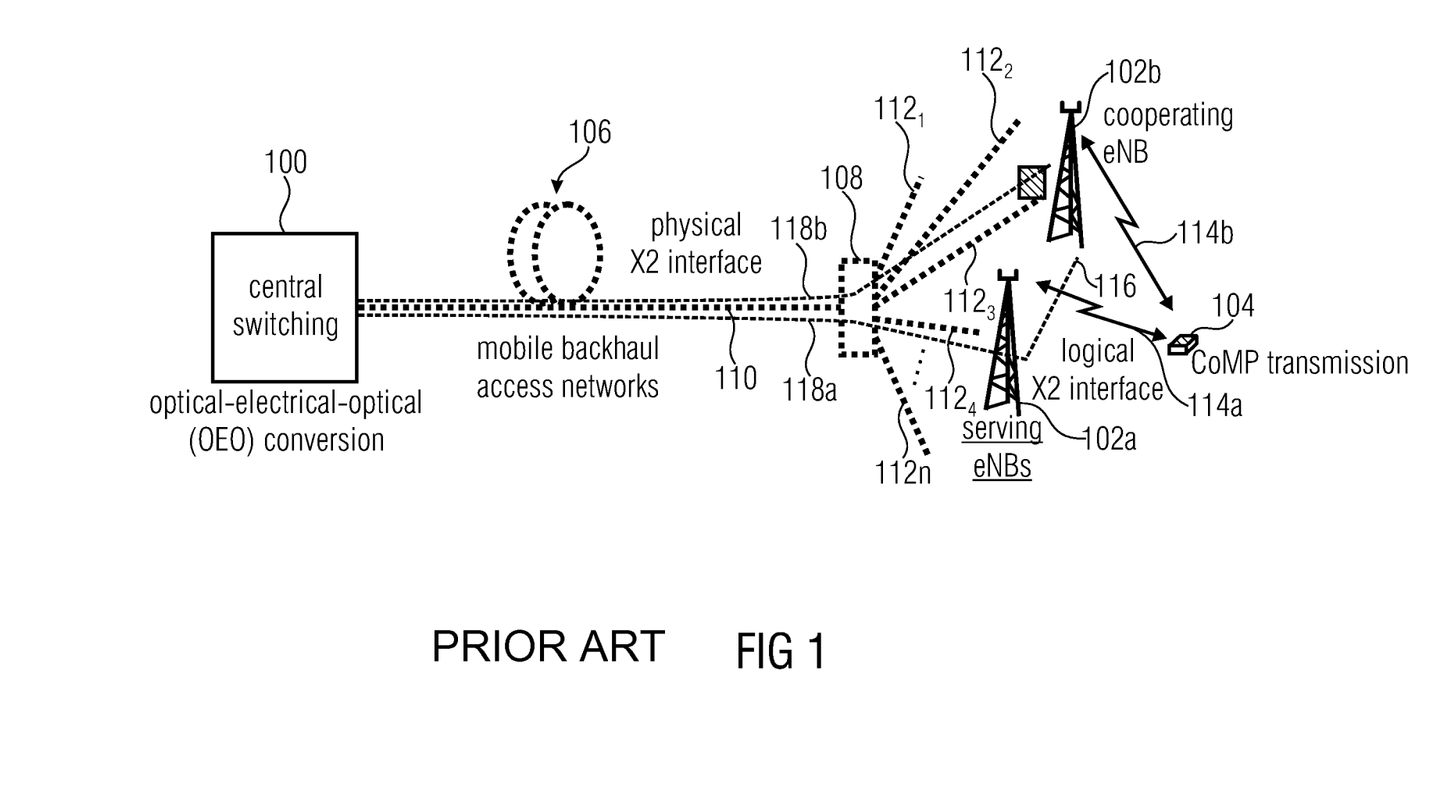
FIG. 1 shows an example of physical and logical X2 interfaces in a mobile backhaul access network.

FIG. 1 shows an example of physical and logical X2 interfaces in a mobile backhaul access network. The network comprises a central switching unit 100 and a plurality of base stations 102a, 102b servicing respective mobile units, e.g. mobile unit 104. FIG. 1 is just a schematic representation and in reality a communication system will comprise a plurality of mobile units and also a plurality of base stations, i.e. more than two base stations. The central switching unit 100 and the respective base stations 102a and 102b are connected via a mobile backhaul access network 106. The network 106 may be an optical network which comprises an optical multiplexer/demultiplexer device 108 for combining/splitting signals transmitted via the network 106. The network 106 comprises a connection 110 (e.g. an optical fiber) between the central switching unit 100 and the optical multiplexer/demultiplexer device 108 and a plurality of branches $112_1$-$112_n$ (e.g. optical fibers). The base station 102a is connected to the central switching unit 100 via the connection 110 and the branch $112_4$, and the base station 112b is connected to the central switching unit 100 via the connection 110 and the branch $112_3$. The mobile unit 104 is provided for a CoMP transmission, i.e. the unit 104 communicates with the base station 102a via a first channel 114a and with the base station 102b via a second channel 114b. This communication needs the exchange of information, e.g. the exchange of signals and data, between the neighboring base stations 102a and 102b. The base station 102a is assumed to be the servicing base station or servicing eNB, and the base station 102b is assumed to be the cooperating base station or cooperating eNB. The exchange of information between the base stations 102a and 102b needs the above-mentioned X2 interface which is a logical interface schematically shown in FIG. 1 at reference sign 116. The logical X2 interface is realized via a physical interface, the physical X2 interface, shown in FIG. 1 at reference signs 118a and 118b. The physical X2 interface has a first component 118a extending between the servicing node 102a and the central switching unit 100 and a second component 118b between the central switching unit 100 and the cooperating node 102b. For transmitting data between the nodes 102a and 102b using the logical X2 interface for supporting the CoMP transmission of the mobile unit 104, it is needed to transmit the actual data from the servicing node 102a via the first component 118a of the physical X2 interface to the central switching unit 100 and from the central switching unit 100 back to the cooperating node 102b via the second component 118b of the physical X2 interface 118b.

The physical X2 interface 118a, 118b is realized using the network 106 and the S1 traffic and the X2 traffic share the resources of the network 106. While this may minimize or reduce hardware costs, it results in the problem that the latency and the capacity of the X2 interface may not fulfill the requirements for information exchange in accordance with the CoMP scheme. Implementing the X2 logical interface in a way as depicted in FIG. 1 incorporates a large delay associated with the OEO conversion and the packet processing and due to the long fiber transmission via the links 118a and 118b. In addition, a large processing burden for the central gateway (the central switching unit 100) exists due to the additional OEO conversion. Further, since the X2 interface shares the physical link with the S1-U interface only limited bandwidth is available.

So far, the implementation of the X2 interface as depicted in FIG. 1 has been accepted, since the LTE release 8 (LTE=long-term evolution) only necessitates that the latency of an X2 interface needs to be in the range of 20 ms maximum with a typical average of 10 ms, which is not a problem in the implementation shown in FIG. 1. The reason for this is that in the practical implementation the X2 communication between respective nodes, the X2 inter-eNB communication was limited, for example, to data forwarded for a handover and for a control plane support for the radio resource management. Such an implementation does not need a low latency in the range of only a few ms as it is needed by a CoMP transmission. However, when implementing a CoMP transmission the latency and the limited capacity of the X2 interface realized in a way as shown in FIG. 1 form a bottleneck for CoMP, since, in general, a CoMP transmission needs less than a few ms latency and a true Gbps traffic for the inter-eNBs communication (the communication between the respective base stations). The exact values depend on the actual CoMP technique realized (see e.g. D. Samardzija and H. Huang, "Determining backhaul bandwidth requirements for network MIMO," EUSIPCO, Glasgow, August 2009 and T. Pfeiffer, "Converged heterogeneous optical metro-access networks," ECOC 2010, Turin, September 2010).

Besides the CoMP schemes also other aspects within a mobile communication network benefit from a direct communication link between respective base stations. For example the increased frequency handover in a network having a smaller cell size in accordance with the LTE-advanced standard will need more information to be exchanged through the X2 interface. For this exchange of large amount of information a direct communication link, i.e. a direct X2 physical interface, between respective base stations may also be interesting. Thus, the use of a direct communication link for the X2 link may not only be of interest for a CoMP transmission, but also for transmission of other data between respective, for example, neighboring nodes or base stations.

For addressing the above problems conventional approaches are known implementing a direct communication link between eNBs for realizing the X2 physical interface instead of implementing the interface using the mobile access network in a way as shown in FIG. 1. One conventional approach would be to provide additional signal lines directly connecting the base stations, e.g. providing additional fiber links between the base stations shown in FIG. 1. However, it is not practical to deploy additional fiber links for the X2 interface due to the associated costs.

Figure 2:
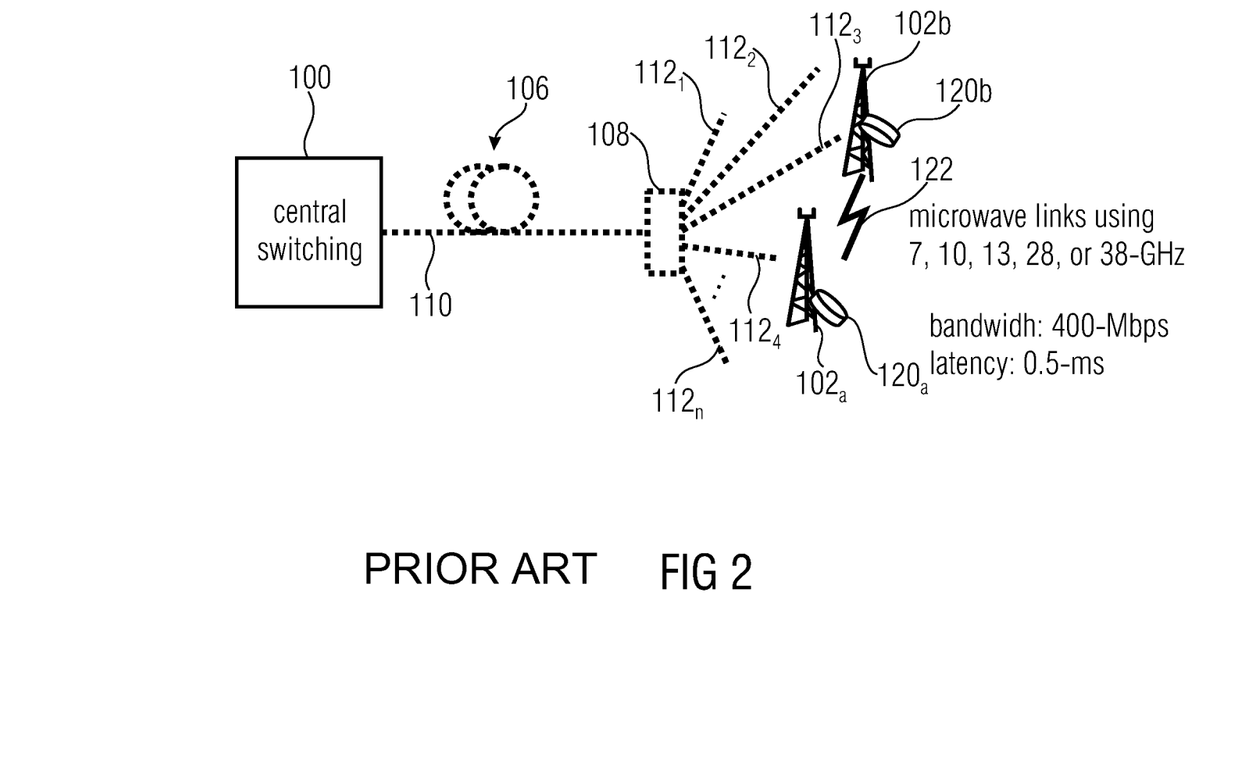
FIG. 2 shows a microwave wireless backhaul link for a direct communication link between respective base stations.

Another conventional approach in shown in FIG. 2 and provides a direct communication link between the respective base stations via a wireless communication link, for example by providing microwave wireless backhaul links. Each of the base stations 102a and 102b is provided with a microwave transceiver 120a, 120b allowing for a wireless communication between the respective base stations 102a and 102b, for example via microwave links operating at 7, 10, 13, 28 or 38 GHz. The direct communication link 122 between the base stations 102a and 102b provides the physical X2 interface allowing for the direct exchange of information in accordance with a logical X2 interface. The communication link 122 allows for a bandwidth of more than 400 Mbps and a latency of about 0.5 ms. However, providing the X2 physical link by installing a microwave/millimeter-wave point-to-point link between two base stations is a very expensive solution as it needs a huge number of additional hardware for the wireless backhauls to cover all nodes. Also an additional license for the frequency band used is needed. Also, the link typically does not offer as much link quality as the backhaul fiber-optic link due to its susceptibility to the environment, e.g. the weather conditions.

Yet another known approach is the use of a TDM-PON (TDM=times division multiplex; PON=passive optical network) having X2 physical links, as described by T. Pfeiffer, "Converged heterogeneous optical metro-access networks," ECOC 2010, Turin, September 2010. A time-division multiplexing passive optical network (TDM-PON) having splitter boxes is used for providing the X2 physical links between the respective nodes. Thus, the drawback of the FIG. 1 embodiment, where the transmission goes through the access gateway is avoided. However, only broadcasting of signals is possible, i.e. no point-to-point communication is possible, as it is needed for a direct communication link between respective base stations or nodes (e.g. needed by the X2 interface). In addition, using the plurality of splitter boxes increases the costs and reduces the SNR (signal-to-noise ratio), which is a problem with regard to the transmission in the Gbps range. In addition, due to the splitting ratio the loss of a large amount of signal-to-noise ratio cannot be avoided thereby limiting the data rate in the X2 interface so that the TDM-PON cannot support more that 1-Gbps bandwidth per node. Further, a plurality of splitters is needed to cover all optical network units in one passive optical network system as well as a careful signaling to avoid collisions between different X2 communications.

SUMMARY OF THE INVENTION

Embodiments of the invention provide a communication system, comprising:

a plurality of nodes adapted to provide for a communication with one or more devices;

a central node;

a passive optical network comprising a multiplexer/demultiplexer device adapted to demultiplex a first optical signal from the central node to the plurality of nodes, and to multiplex second optical signals from one or more of the nodes, each node having allocated a wavelength for generating its optical signal;

wherein for directly transmitting signals from one node to at least one of the other nodes, the one node is adapted to generate an optical signal at the wavelength allocated to the at least one of the other nodes, the optical signal including the signal to be transmitted; and wherein the multiplexer/demultiplexer device of the passive optical network is adapted to combine the optical signal from the one node with the first optical signal.

Embodiments of the invention provide a node adapted to be coupled via a passive optical network to a central node and a plurality of further nodes of a communication system, wherein the node has allocated a wavelength for optical signal transmission that is different from wavelengths allocated to the further nodes, wherein the node comprises an optical source adapted to generate an output signal at at least one of the wavelengths allocated to the further nodes, and wherein for a direct transmission of a signal from the node to at least one of the further nodes, the node is adapted to generate an optical signal at the necessitated one or more wavelengths, the optical signal including the signal to be transmitted.

Embodiments of the invention provide an optical multiplexer/demultiplexer device for a communication system, the communication system comprising a plurality of nodes and a central node coupled via a passive optical network, the optical multiplexer/demultiplexer device comprising:

a first input/output port adapted to be coupled to the central node;

a plurality of second input/output ports adapted to be coupled to the respective nodes, wherein the multiplexer/demultiplexer device is adapted to demultiplex a first optical signal from the central node to the plurality of nodes, and to multiplex second optical signals from one or more of the nodes; and a passive optical coupler arranged between the plurality of second input/output ports and the first input/output port, the passive optical coupler being adapted to couple one or more of the second signals received at the plurality of second input/output ports to the first input/output port.

Embodiments of the invention provide a method for directly transmitting signals between nodes of a communication system, the communication system comprising the plurality of nodes providing for communication with one or more devices, a central node, and a passive optical network comprising a multiplexer/demultiplexer device for demultiplexing a first optical signal from the central node to the plurality of nodes, and for multiplexing second optical signals from one or more of the nodes, each node having allocated a wavelength for generating its optical signal, the method comprising:

for directly transmitting signals from one node to at least one of the other nodes, generating at the one node an optical signal at the wavelength allocated to the at least one of the other nodes, the optical signal including the signal to be transmitted; and combining the optical signal from the one node with the first optical signal at the multiplexer/demultiplexer device.

Further embodiments provide for a computer program product comprising instructions stored by a machine-readable carrier for carrying out the method in accordance with embodiments of the invention when executing the instructions on a computer.

In accordance with embodiments of the invention, for a point-to-point communication from one node to one of the other nodes, the one node is adapted to select the wavelength allocated to the other node and to generate the optical system at the selected wavelength. In such an embodiment, the one node may comprise a narrow spectrum optical source, and the one node may be adapted to set the narrow spectrum optical source to the selected wavelength, modulate the signal to be transmitted to the output signal of the narrow spectrum optical source for generating the optical signal, and transmit the optical signal to the multiplexer/demultiplexer device.

In accordance with other embodiments, a broadcast communication from one node to a plurality of the other nodes may be desired, and in this case the one node is adapted to generate the optical signal at the wavelength allocated to the other node. It is noted that these embodiments may be implemented together with embodiments allowing a point-to-point communication or maybe implemented separately therefrom. In accordance with such embodiments, the one node may comprise a broad spectrum optical source comprising the wavelengths allocated to the plurality of nodes, and the one node may be adapted to modulate the signal to be broadcast to the output signal of the broad spectrum optical source to generate the optical signal, and to transmit the optical signal to the multiplexer/demultiplexer device.

In accordance with embodiments of the invention, a node may comprise an optical detector adapted to detect an optical signal at the wavelength allocated to the node, as well as an optical source adapted to provide a signal at the wavelength allocated to the node on the basis of which a second signal is generated which is to be transmitted from the node to the central node.

In accordance with embodiments, the multiplexer/demultiplexer device of the passive optical network includes a first input/output port adapted to be coupled to the central node and a plurality of second input/output ports adapted to be coupled to the respective nodes. Further, a passive optical coupler may be arranged between the plurality of second input/output ports and the first input/output port to couple one or more of the second signals received at the plurality of the second input/output port to the first input/output port.

In accordance with embodiments, the communication system may be a wireless communication system, wherein the plurality of nodes is are provided for a wireless communication with one or more wireless devices, wherein the central node is a central switching node, and wherein the passive optical network forms the backhaul link between the central switching node and the nodes. The signal to be transmitted between the nodes may be a signal comprising X2 data.

A node in accordance with embodiments of the invention may comprise a narrow spectrum optical source that is tunable to one of the wavelengths allocated to the further nodes and/or a broad spectrum optical source comprising the wavelengths allocated to the further nodes. The narrow spectrum optical source may be a tunable laser, and the broad spectrum optical source may be a light emitting diode.

The optical multiplexer/demultiplexer device, in accordance with embodiments, may be an arrayed waveguide grating.

In accordance with embodiments of the invention, approaches are provided that allow for a coordinated multipoint (CoMP) transmission/reception technique to be used, for example, for LTE-advanced applications due to its potential to provide higher user throughput by cooperating with multiple base stations. The performance strongly depends on the capacity, latency and other features of the mobile backhaul access network, particularly the X2 interface. Since the X2 interface is a logical interface, it is not in a position to fully support CoMP techniques, unless the X2 physical link is utilized. In accordance with embodiments of the invention, the X2 physical interface for point-to-point and broadcasting communications in wavelength division multiplexing based fiber-optical access networks is provided, which offers a larger capacity and a lower latency than conventional X2 logical interfaces. Thus, the inventive approach is advantageous and it fully supports the CoMP techniques resulting in an improved user throughput. Compared to microwave/millimeter-wave wireless backhaul links currently used for implementing X2 physical links, the inventive approach provides a larger capacity, a better link quality and less susceptibility to the environment. Since it uses previously deployed low loss fiber networks, it is more cost-effective than the wireless backhaul links that need additional system hardware and additional frequency licenses.

Thus, embodiments are advantageous as they offer a large capacity and a low latency for the X2 physical interface resulting in an increased cell user throughput by fully exploiting the CoMP techniques and by allowing more efficient handover and control signal exchange by using the X2 interface, together with the CoMP technique or independent therefrom. Further, the implementation of the X2 physical interface is more cost-effective than conventional approaches, especially a wireless backhaul link, thereby reducing the costs associated with implementing the X2 interface.

Embodiments of the invention are a mobile backhaul WDM (Wavelength Division Multiplexing) access network having a physical X2 interface for CoMP applications. A further development of a backhaul of a communication network based on a WDM-PON (wavelength division multiplexing passive optical networks) access network is described. This is advantageous for the new generation mobile networks needing a "direct" exchange of information between base stations at a sufficient data rate and at a sufficiently low latency, for example using the X2 interface. In accordance with the teachings of the invention, the favorable properties of the WDM-PON access network are exploited, thereby avoiding needless costs for implementing the direct transmission path between the base stations by providing the needed transmission capacity and transmission characteristics. The respective base stations or nodes and the multiplexer/demultiplexer of the WDM-PON necessitate only minor changes. The multiplexer/demultiplexer device is provided with an additional passive optical coupler allowing the coupling of the signals received from the plurality of nodes back to an input of the multiplexer/demultiplexer device for redistributing the signal to the nodes. The nodes or base stations are provided with an additional optical source which may be an optical source that can be tuned to a desired wavelength used by a target node, or which may be a broadband optical source generating an optical signal covering all wavelengths used by the nodes in the system. In case of a desired exchange of information between respective nodes, either a broadcast communication or a point-to-point communication is initiated.

For the broadcast communication, embodiments provide a LED (Light Emitting Diode), and the output signal of the LED covers all wavelengths used by the nodes in the communication system or in a specific part of the communication system connected by the WDM-PON. The signal to be transmitted is modulated onto the output signal of the LED and transferred to the multiplexer/demultiplexer device which couples this signal to its input, thereby distributing it among all nodes. Since the signal comprises signal portions at all wavelengths, all nodes receive a broadcast communication, which may be detected by a respective photo detector of the nodes. In case of a point-to-point communication, embodiments of the invention provide a tunable laser which is used for selecting one of the plurality of wavelengths used with among the nodes coupled to the passive optical network. The tunable laser generates the optical signal which is modulated with the information to be transmitted and is transferred to the multiplexer/demultiplexer device, more specifically via the coupler provided therewith to its input so that it is again distributed to the network and forwarded to the desired node.

Thus, embodiments of the invention provide an X2 physical interface allowing not only a point-to-point communication or link, but also a broadcasting link in a mobile WDM-access network. Embodiments of the invention allow an extremely low latency and a high capacity of the X2 interface which is favorable for CoMP transmissions. In addition, the additional costs for the deployment of additional fiber links or microwave links only for the X2 interface is avoided, thereby minimizing the construction costs. Thus, embodiments of the invention provide a novel WDM-PON system having X2 physical links supporting not only point-to-point communication, but also a broadcasting communication among the nodes.

In accordance with embodiments of the invention, the X2 physical interface is realized using a WDM-PON architecture and all components used in accordance with the inventive approach are fully compliant with the conventional, existing WDM-PON system, so that also a cost-efficient solution is provided.

BRIEF DESCRIPTION OF THE DRAWINGS

Embodiments of the invention are not described with reference to the accompanying drawings in which.

DETAILED DESCRIPTION OF THE PREFERRED EMBODIMENTS

Figure 3A:
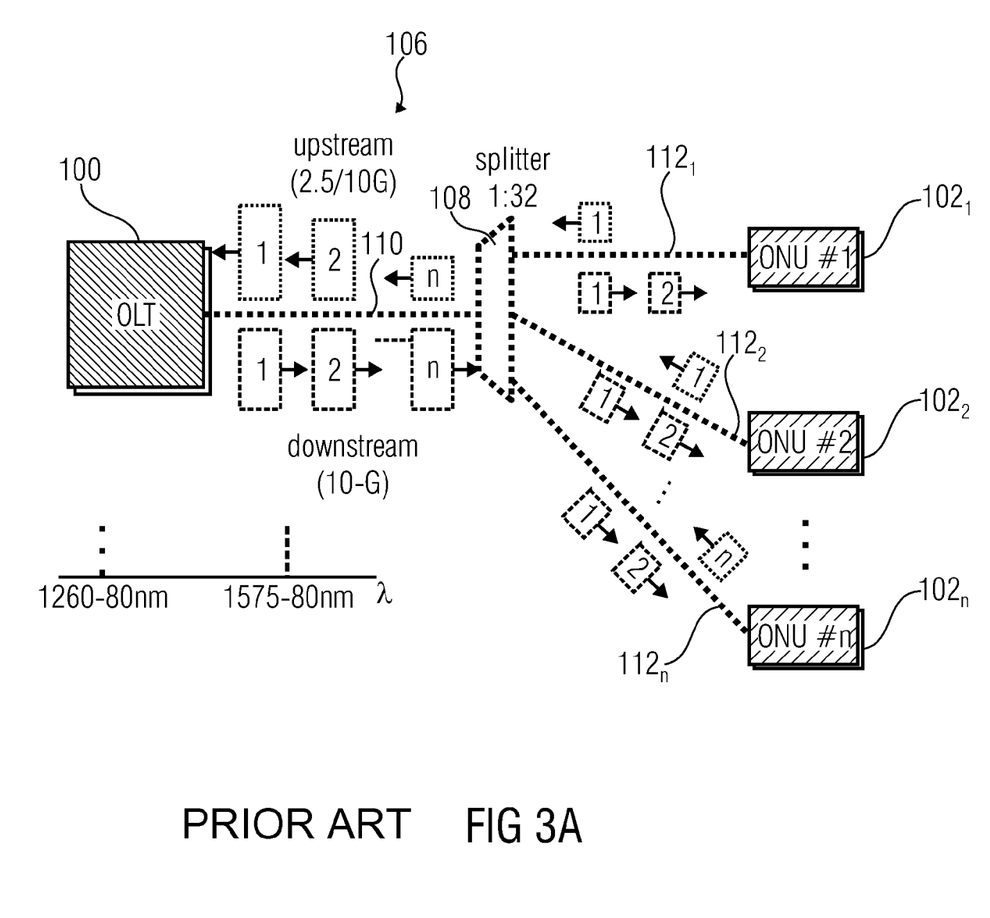
FIG. 3A shows a schematic representation of a time division multiplexing passive optical network (TDM-PON)

On the basis of FIG. 3, the differences between a TDM-PON and a WDM-PON are discussed. FIG. 3A shows a schematic representation of a time division multiplexing passive optical network (TDM-PON). The TDM-PON comprises the central switching unit 100 (OLT=optical line terminal) and the splitter 108 coupled to the OLT 100 via the connection 110, which is a fiber optic connection. The splitter 108 is further connected to a plurality base stations (ONU=optical network unit) $102_1$ to $102_n$. Each of the optical network units $102_1$ to $102_n$ is connected to the splitter 108 via a respective branch connection $112_1$ to $112_n$ formed of respective optical fibers. The splitter 108 may be a 1:32 splitter, meaning that 32 different optical network units $102_1$ to $102_n$ may be serviced, i.e. n=32. The TDM-PON operates in a wavelength range of 1260-1280 nm for the uplink or upstream connection, i.e. for transmitting data from one or more of the optical network units $102_1$ to $102_n$ to the optical line terminal 100. For the downstream or downlink transmission from the unit 100 to the respective optical network units $102_1$ to $102_n$ a wavelength between 1575 and 1580 nm is used. In accordance with the time division multiplexing approach, information packages are distributed in the upstream and downstream direction as depicted in FIG. 3A.

Figure 3B:
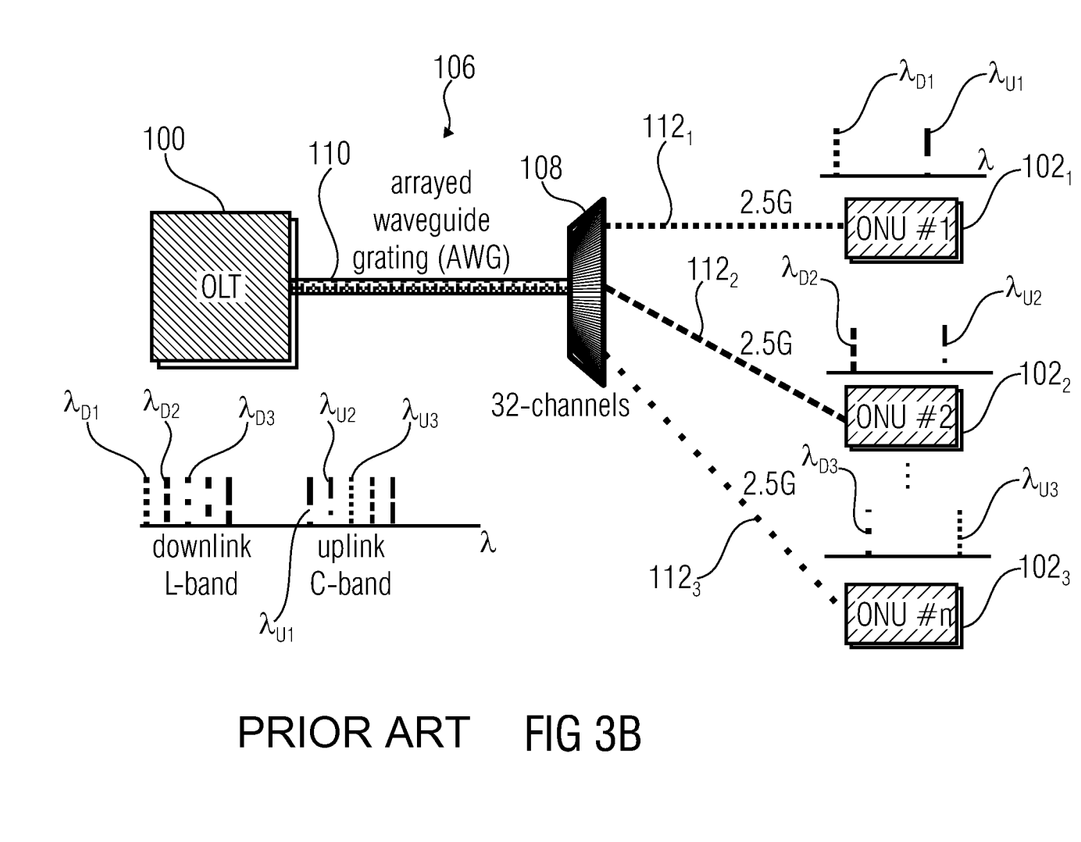
FIG. 3B shows a schematic representation of a wavelength division multiplexing passive optical network (WDM-PON)

FIG. 3B shows a schematic representation of a wavelength division multiplexing passive optical network (WDM-PON). The WDM-PON comprises the optical line terminal 100 and the plurality of optical network units $102_1$ to $102_3$. The splitter 108 comprises an arrayed waveguide grating providing 32 channels so that 32 optical network units may be served by the PON. Also, respective fiber connections 110 and $112_1$ to $112_3$ between the optical line terminal 100 and the plurality of optical network units $102_1$ to $102_3$ are shown. Each of the optical network units or base stations $102_1$ to $102_3$ has allocated a first wavelength $\lambda_{D1}$ to $\lambda_{D3}$ for the downlink connection. The first wavelengths are in the L-band so that signals transmitted from the optical line terminal 100 towards the respective optical network units $102_1$ to $102_3$ are transmitted on one of the first or download wavelengths. A signal is automatically directed towards the desired optical network unit via the arrayed waveguide grating 108. In addition, each of the optical networks units $102_1$ to $102_3$ comprises an uplink wavelength $\lambda_{U1}$ to $\lambda_{U3}$ (in the C-band) used for sending data from a respective optical network unit $102_1$ to $102_3$ to the central switching unit 100.

Figure 4:
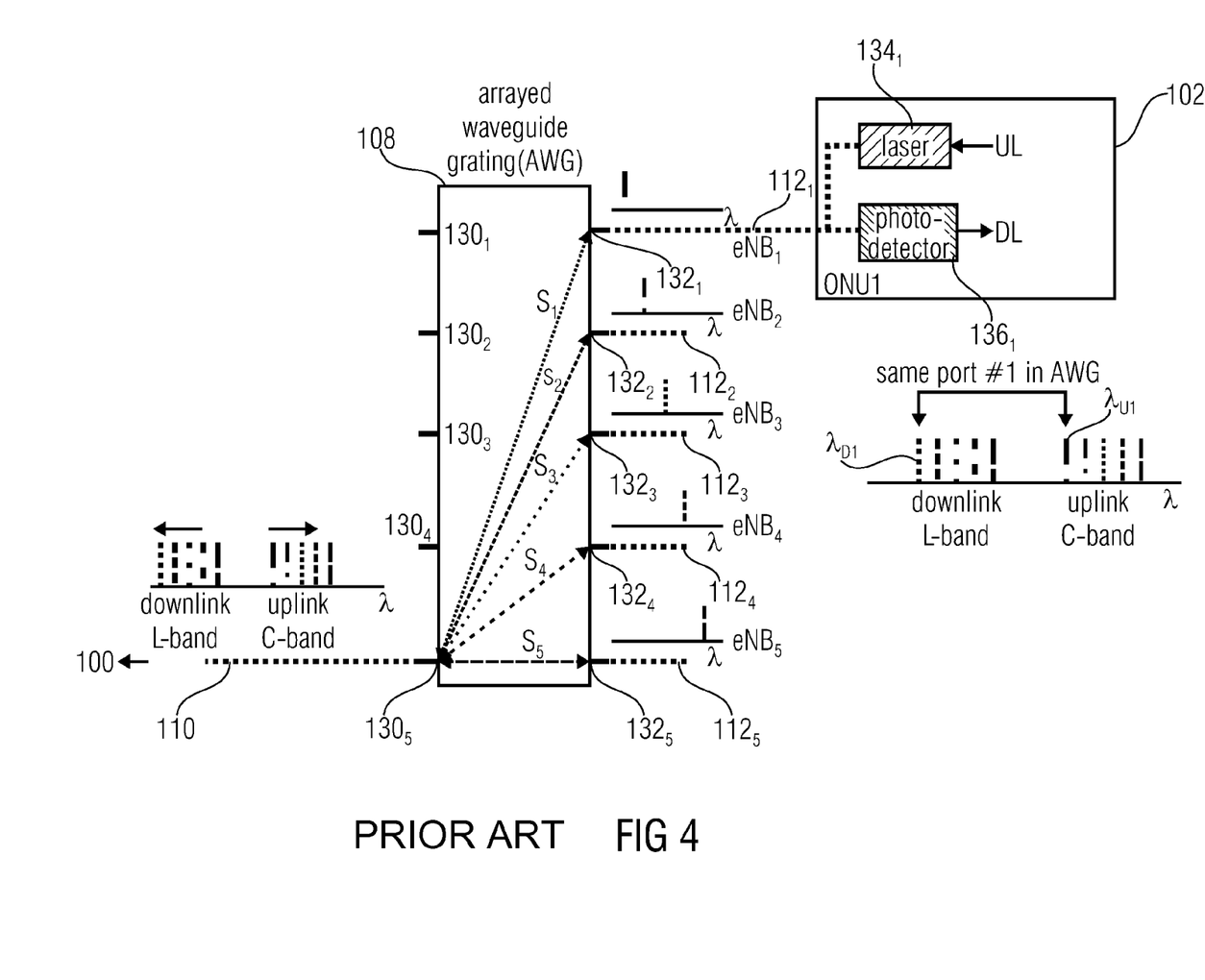
FIG. 4 shows an enlarged view of the conventional WDM-PON access network.

FIG. 4 shows an enlarged view of the conventional WDM-PON access network showing further details of an arrayed waveguide grating 108 and the optical network unit or base station $102_1$. The arrayed waveguide grating 108 has a plurality of input ports $130_1$ to $130_5$, and a plurality of output ports $132_1$ to $132_5$. Of the input ports $130_1$ to $130_5$ only input port $130_5$ is connected to the fiber 110 for connecting the arrayed waveguide grating (AWG) 108 to the optical line terminal or the central node 100 (not shown in FIG. 4). The remaining input ports $130_1$ to $130_4$ are not used. The output ports $132_1$ to $132_5$ of the (AWG) 108 are connected via the respective optical fibers $112_1$ to $112_5$ to the respective optical network units or base stations. In FIG. 4 only unit $102_1$ is shown. The AWG 108 distributes the optical signals received at its input $130_5$ dependent on the wavelength of the received signal to the respective output ports $132_1$ to $132_5$, as is indicated by the arrows indicating the respective signals $S_1$ to $S_5$ transmitted between the input port $130_5$ and the respective output port $132_1$ to $132_5$. Between the input port and the output port a bidirectional transmission of the signals $S_1$ to $S_5$ is possible for transmitting data from the central unit 100 to the respective optical network units, and for transmitting data from one or more of the optical network units to the central unit 100. The respective optical signals have a predefined wavelength associated with each optical network unit for the downlink connection and for the uplink connection. The optical network unit further comprises a laser $134_1$ that provides an output signal at the wavelength $\lambda_{U1}$ that is modulated with the information to be transmitted in the uplink channel from the unit $102_1$ to the central node 100. The unit $102_1$ further comprises a photo detector $136_1$ for detecting an optical signal at the downlink wavelength $\lambda_{D1}$ associated with the optical network unit $102_1$ for detecting optical signals sent from the OLT 100 to the unit $102_1$ on the downlink connection.

Figure 5:
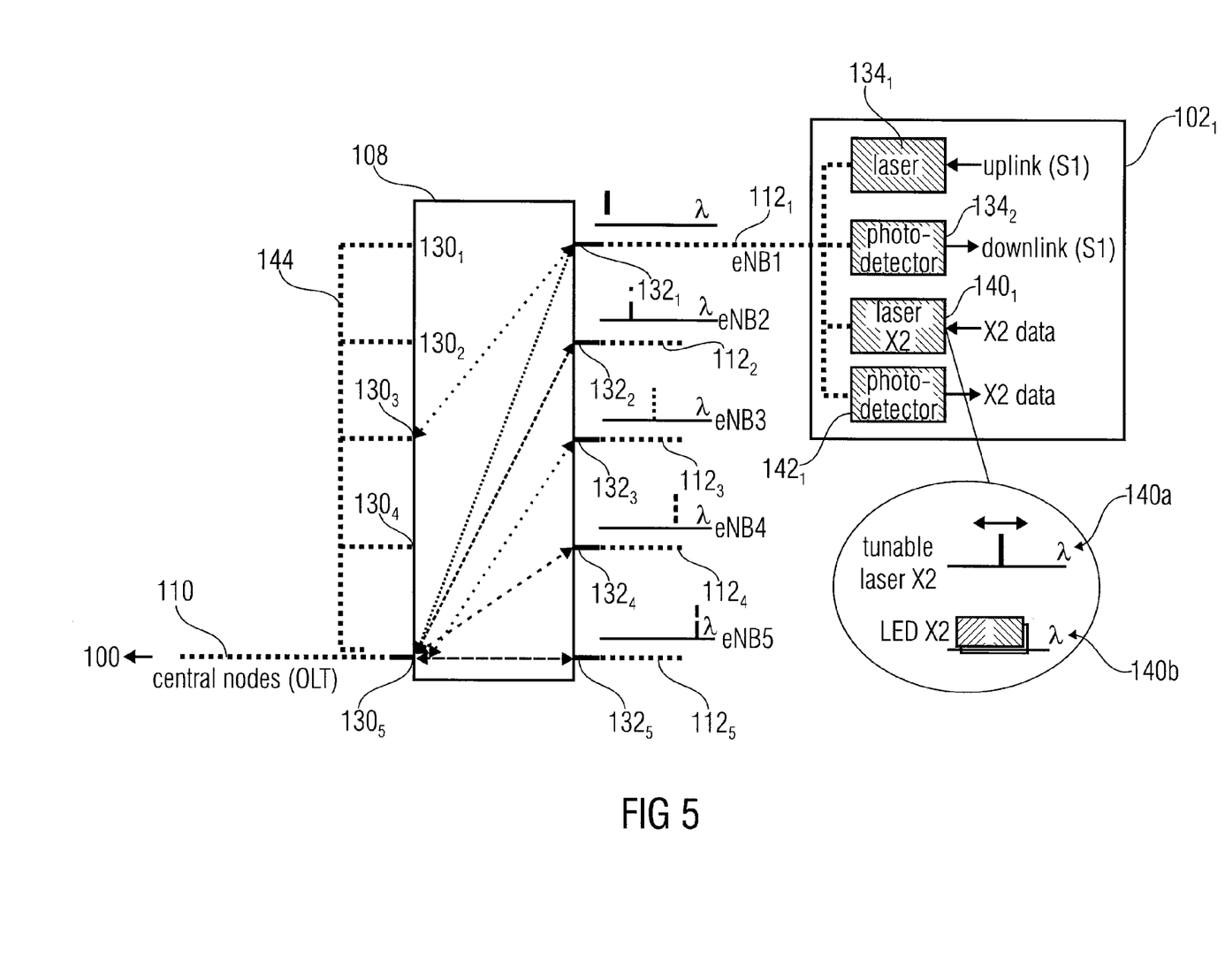
FIG. 5 shows a WDM-PON architecture having a physical X2 interface in accordance with embodiments of the invention.

Embodiments of the invention are based on conventional WDM-PON systems described e.g. in FIGS. 3B and 4. On the basis of this known architecture the X2 physical interface is implemented. FIG. 5 shows a WDM-PON architecture having a physical X2 interface in accordance with embodiments of the invention. Each node is modified by providing in addition to the laser 134 and the photo detector 136 a further optical source $140_1$ and a further photo detector $142_1$. The source $140_1$ and the photo detector $142_1$ are provided for allowing a transmission/reception of X2 data. The further optical source $140_1$ may be formed either by a tunable laser 140a or by an LED 114b. In accordance with embodiments, either the tunable laser 140a or the LED 140b may be implemented in the node $102_1$. Alternatively, in case point-to-point communication and broadcasting communication is desired, the tunable laser 140a and the LED 140b may be provided in the unit 102. In addition, the arrayed waveguide grating 108 is provided with a passive optical coupler 144 for coupling signals at the ports $130_1$ to $130_4$ back to the input port $130_5$. Thus, in accordance with embodiments of the invention, an additional tunable laser 140a and/or a broad spectrum optical source 140b for transmitting X2 signals is provided in combination with the passive optical coupler 144 in the arrayed waveguide grating 108 for the re-routing of the X2 signals.

For an X2 point-to-point communication the source eNB $102_1$ generates a signal with a wavelength allocated to the target eNB utilizing the tunable laser 140a, modulates the X2 signals to the signal and transmits the signal through the fiber $112_1$ to the port $132_1$ of the AWG 108 which guides the signal e.g. to port $130_3$. Because the port $130_3$ of the AWG 108 is combined and applied to the main input port $130_5$ via the passive optical coupler 144, the X2 optical signals generated at the source node are automatically routed to the target node, i.e. from the input port $130_5$ to the port associated with the wavelength, e.g. $132_3$. This routing is done in the passive AVG 100, so that it is not needed to add any active components, thereby avoiding any increase in costs. This X2 point-to-point link transmits a large amount of data and allows a higher SNR than broadcasting. The modulation speed of the tunable laser 140a is usually higher than 2.5-Gbps.

In addition, X2 broadcasting can be implemented, i.e. broadcasting X2 data from one node to all nodes that belong to the PON system. In such a case, a broad spectrum light emitting diode LED 140b is used instead of a tunable laser source 140a. As mentioned above, both optical sources may be provided in a node, so that it can be switched between the point-to-point communication and the broadcasting communication and dependent on the selected mode either the tunable laser or the LED is used. Since LEDs are much cheaper than tunable laser sources, the co-location of a tunable laser and the LED is economically feasible. However, other embodiments may use only one of the optical sources dependent on the requirements in the system. The LED contains all wavelengths that are allocated to the nodes that belong to the PON system and therefore X2 signals are distributed to all nodes through the AWG 100.

The new WDM-PON architecture having the physical X2 interface allows for an improved CoMP performance resulting in an improved user throughput. The CoMP technique imposes several constraints on mobile backhaul networks in terms of capacity and latency. These constraints have to be resolved by the network architecture, particularly by providing the X2 interface, as otherwise the performance gain of the CoMP approach is limited or using the CoMP approach may even be impossible. It turned out that without a direct internode X2 physical link the X2 interface may not be enough to fully support all CoMP techniques, however, the inventive approach allows X2 physical links for both point-to-point communication and broadcasting communication in WDM-based fiber-optical access networks providing a larger capacity and a better link quality than microwave wireless backhaul links that have been used conventionally for the inter-node communications. Therefore, CoMP techniques are fully supported by the inventive approach eventually resulting in an improved user throughput. Also, additional functionality is obtained, namely X2 broadcasting, that the wireless backhauling is not capable of so that signaling for the CoMP technique may be further reduced.

A further advantage is that the X2 physical connection is obtained with reduced construction costs. As described earlier, the microwave wireless backhaul links are conventional approaches to build X2 physical interfaces, however, in addition to the limitation that these wireless backhaul links result in a low link quality and a low capacity when compared to fiber-optical links, the main problem are the high costs for the wireless backhaul system hardware and the need for a further frequency license. The inventive approach is advantageous as the only additional components that are needed in the base stations are one or two optical sources, the laser diode and/or the LED and one additional photo detector. In addition, at the splitter 108 a further coupling element is to be provided, however, without implementing additional active elements. The additional elements needed for realizing the inventive approach are well-known elements which can be obtained at low prices so that the system can be implemented much cheaper when compared to the system hardware costs needed for the wireless backhaul X2 link. In addition, a much better quality of service than a wireless backhaul link is obtained as it exploits the benefits of the fiber-links for the X2 physical interface.

Yet another advantage of the inventive approach is the high flexibility with regard to a network reconfiguration. For example, X2 links may also be used for S1-U links in case the requested data traffic for the S1 interface is too high. In this case, a tunable laser generates the wavelength allocated to itself. Like the S1-interface it is transmitted from the optical network unit to the optical line terminal not disturbing the X2 interface. This additional link can provide almost the same capacity as the S1 link does, and therefore the data capacity, in an ideal case, is doubled by using such a configuration. This will result in a higher network flexibility due to the capability of a link reconfiguration.

Figure 6:
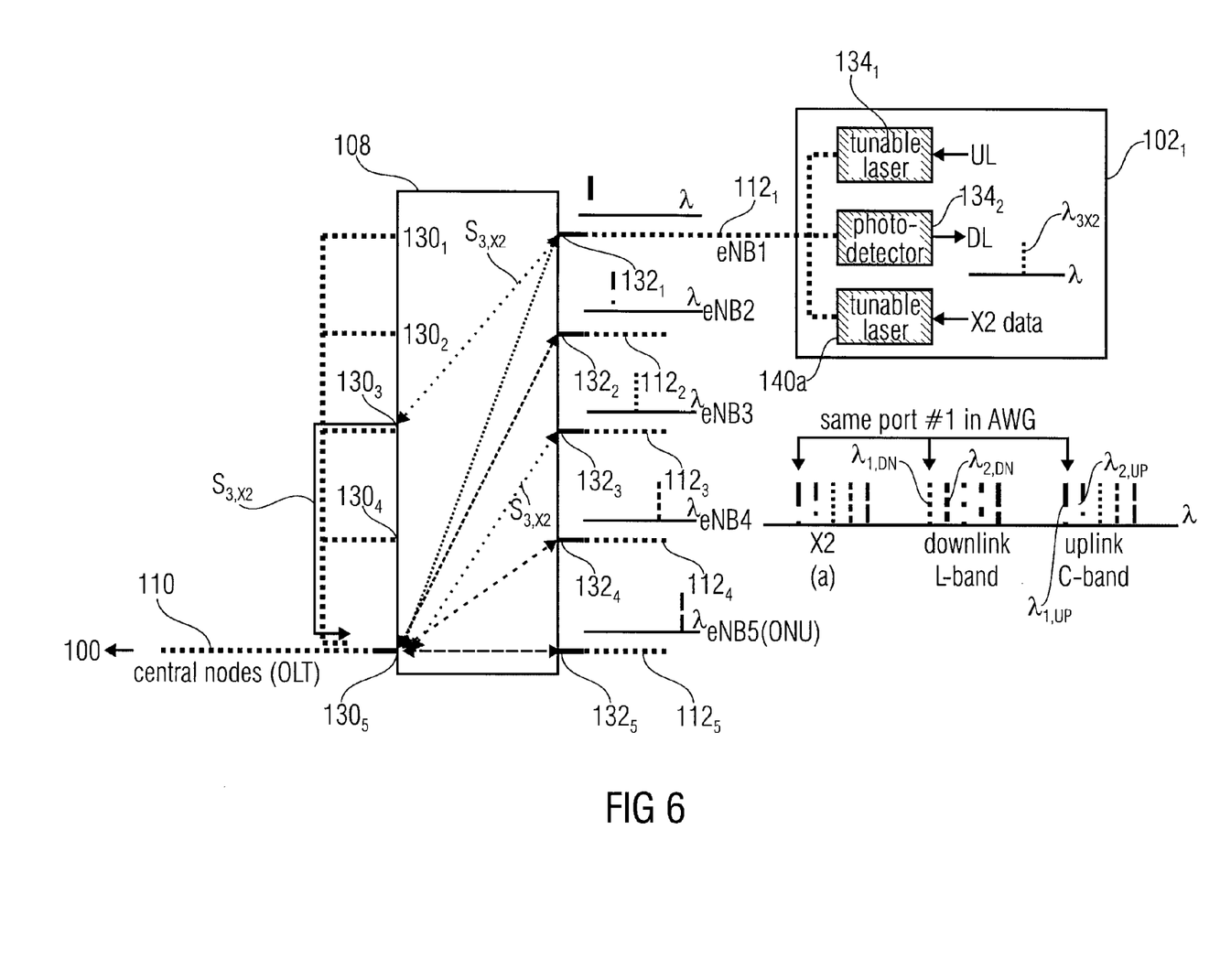
FIG. 6 shows an embodiment of the invention comprising the WDM access network having an X2 point-to-point physical link.

FIG. 6 shows an embodiment of the invention comprising the WDM access network having an X2 point-to-point physical link. FIG. 6 describes details of the WDM-PON architecture providing X2 point-to-point links. The arrayed waveguide grating 108 is a fiber-coupled passive device that can separate or combine optical signals having different wavelengths. It is commonly used as an optical multiplexer/demultiplexer, also in conventional WDM-PON systems. In case of a downlink communication, optical signals with different wavelengths are demultiplexed to the different ports $132_1$ to $132_5$. It is assumed that $\lambda_{1,DN}$ is allocated for a downlink transmission to node $102_1$ (eNB1). A wavelength $\lambda_{2,DN}$ is allocated to the second node eNB2, etc. For an uplink transmission different wavelengths can be used, since the AWG 108 shows a periodicity with regard to the wavelength separation. More specifically, the uplink for the node eNB1 can use a different wavelength $\lambda_{1,UP}$, separated from the downlink band by a predefined spectral range as is depicted in FIG. 6(a). The uplink wavelength $\lambda_{1,UP}$ of the node eNB1 exhibits the same multiplexing characteristics as its downlink wavelength $\lambda_{1,DN}$. The laser $134_1$ may be a tunable laser and may be used for the uplink transmission for generating the uplink wavelength $\lambda_{1,UP}$. The tunable laser is set to the desired wavelength and its output is modulated with the uplink data which is transmitted through the fiber link $112_1$ to the grating 108. Once the tunable laser $134_1$ is set to generate the uplink wavelength $\lambda_{1,UP}$, it is not changed as there is no need to do so. In accordance with other embodiments, a non-tunable uplink transmitter may be used.

In accordance with the inventive approach, the additional tunable laser $140_1$ for providing the X2 physical interface is provided and its tunable characteristics are fully utilized in combination with the modified grating 108 having integrated the passive coupler 144. In order to avoid collisions with downlink or uplink optical signals, the X2 link uses a different band, where the grating 108 shows the same spectral characteristics. FIG. 6(a) shows the different bands for the X2 signal transmission, the downlink transmission and the uplink transmission. In case the source eNB $102_1$ desires to transmit X2 data to a target, e.g. eNB3, the tunable laser $140_1$ is set to generate the wavelength allocated to the target eNB. For example, for sending X2 data to the node eNB3, the tunable laser in the node $102_1$ (eNB1) generates an X2 wavelength $\lambda_{3,X2}$. The data is modulated onto the signal from the laser to generate the output signal $S_{3,X2}$. This signal $S_{3,X2}$ is routed in the uplink direction via optical fiber $112_1$ to the port $132_1$ of the AWG 108. The AWG 108 guides the signal $S_{3,X2}$ to the port $130_3$. The integrated passive optical coupler 144 in the grating 108 delivers the signal $S_{3,X2}$ to the main input port $130_5$ of the grating 108 and then, following the AWG 108 characteristics, this signal $S_{3,X2}$ is automatically routed via port $132_3$ and fiber $112_3$ to eNB3.

In accordance with the embodiments of the invention, all nodes have the information which wavelengths are allocated to the other eNBs that belong to the same PON system. Thus, each eNB knows which wavelength has to be used to transmit X2 data to another of the eNBs. This is all done by optical processing resulting in an extremely low latency that can be achieved with the X2 interface. Also, this provides for a higher capacity of the X2 interface since the optical link is completely independent from the up/downlink capacity.

Figure 7:
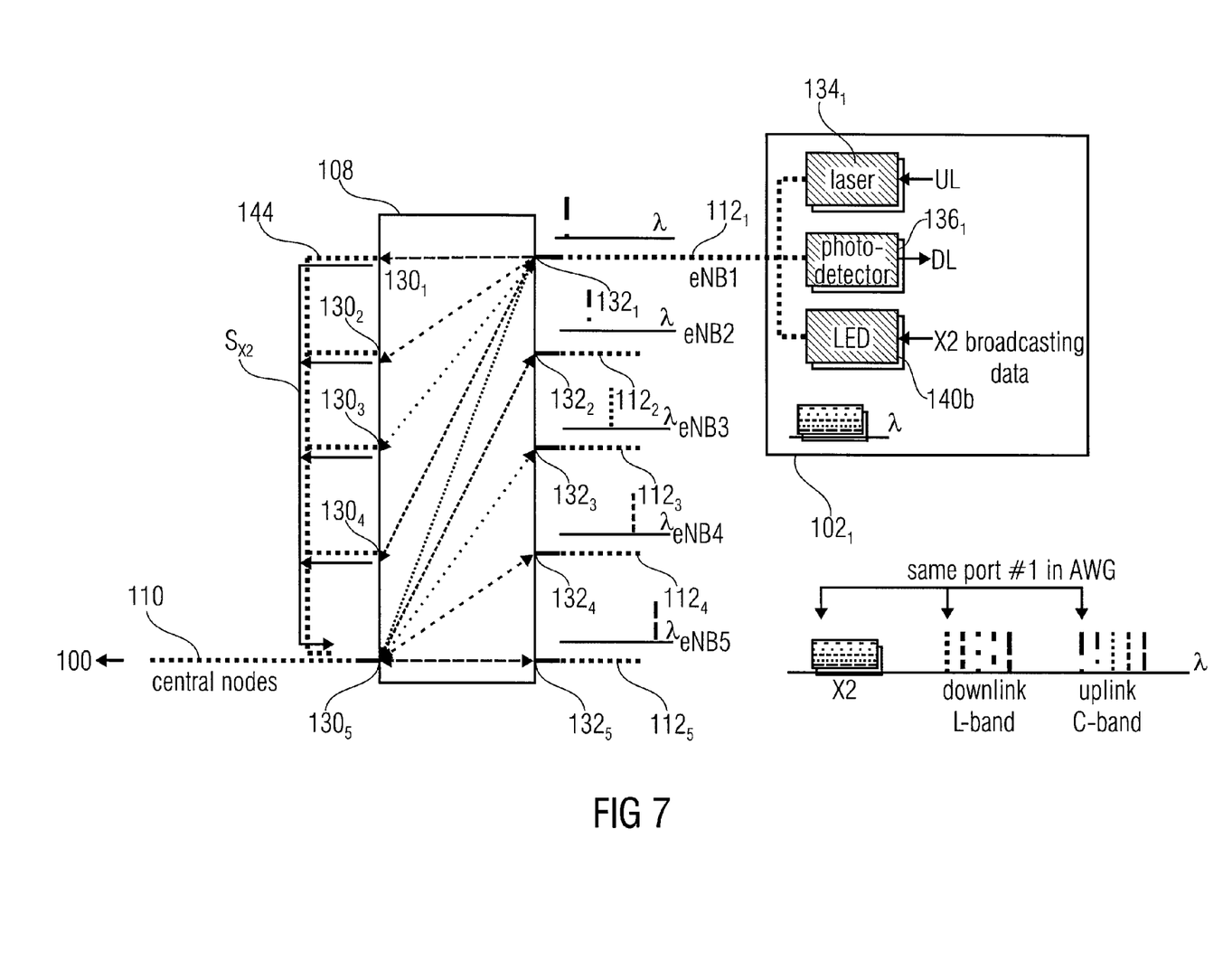
FIG. 7 shows an example of the inventive approach for X2 broadcasting.

FIG. 7 shows an example of the inventive approach for X2 broadcasting. For realizing a broadcasting X2 interface the node or base station $102_1$ is provided with a broad spectrum optical source 140b instead of the narrow spectrum optical source used in FIG. 6. The broad spectrum optical source may be a LED or a S-LED instead of the tunable laser. FIG. 6 shows the WDM-PON architecture with the broadcasting links. The broad spectrum optical source 140b generates a signal containing all wavelengths allocated to all eNBs in the PON. Thus, broadcasting from one node to all other nodes can be done by modulating the X2 broadcasting data onto the output signal on the broad spectrum optical source. In the example shown in FIG. 7 eNB1 generates a broadcast signal which is send via the fiber $112_1$ to the port $132_1$ of the AWG 108. The AWG 108 distributes the respective signal components to the ports $130_1$ to $130_4$. The coupler 144 routes the signal components from the ports $130_1$ to $130_4$ to the input port $130_5$, so that the AWG 108 distributes the signals to the respective eNBs. The broad spectrum optical sources, like LEDs, have a limited modulation speed with a maximum of several hundreds of Mbps, however, this is in general not a problem, as the broadcasting approach is used for control signaling, but not for data exchange. It is also possible to have the two functionalities of point-to-point and broadcasting combined because the broad spectrum optical sources are quite cheap.

While embodiments were described in which each node has allocated only one wavelength, it is noted that other embodiments may allocate more than one wavelength to a node. Also, embodiments may provide for a point-to-point communication using the original laser $134_1$ that is tunable. In such embodiments S1 traffic and X2 traffic share the same optical source. While embodiments were described in the context of CoMP schemes also other aspects within a mobile communication network benefit from a direct communication link between respective base stations. For example the increased frequency handover in a network having a smaller cell size in accordance with the LTE-advanced standard will need more information to be exchanged through the X2 interface. Thus, the use of a direct communication link for the X2 link may not only be of interest for a CoMP transmission, but also for transmission of other data between respective, for example, neighboring nodes or base stations.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed. Some embodiments according to the invention comprise a data carrier having electronically readable control signals, which are capable of cooperating with a programmable computer system, such that one of the methods described herein is performed. Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A communication system, comprising:
   a plurality of nodes adapted to provide for a communication with one or more devices;
   a central node;
   a passive optical network comprising a multiplexer/demultiplexer device adapted to demultiplex a first optical signal from the central node to the plurality of nodes, and to multiplex second optical signals from one or more of the nodes, each node having allocated a wavelength for generating its optical signal;
   wherein for directly transmitting signals from one node to at least one of the other nodes, the one node is adapted to generate a third optical signal at a wavelength allocated to the at least one of the other nodes; and
   wherein the multiplexer/demultiplexer device of the passive optical network is adapted to combine the third optical signal from the one node with the first optical signal,
   wherein the multiplexer/demultiplexer device comprises:
      a first plurality of input/output (I/O) ports comprising one I/O port adapted to be coupled to the central node and other I/O ports not including the one I/O port;
      a second plurality of input/output (I/O) ports, wherein individual I/O ports of the second plurality of I/O ports are adapted to be coupled to one of the nodes;
   wherein the multiplexer/demultiplexer device is adapted to demultiplex the first optical signal sent to the one I/O port from the central node to the nodes via the second plurality of I/O ports and to multiplex the second optical signals sent to the second plurality of I/O ports from the nodes; and
   a passive optical coupler arranged for coupling the one I/O port to the other I/O ports, the passive optical coupler being adapted to combine the third optical signal sent from the one node with the first optical signal.

2. The communication system of claim 1, wherein for a point-to-point communication from the one node to one of the other nodes, the one node is adapted to select the wavelength allocated to the other node and to generate the third optical signal at the selected wavelength.

3. The communication system of claim 2, wherein the one node comprises a narrow spectrum optical source, and wherein the one node is adapted to set the narrow spectrum optical source to the selected wavelength, to modulate the signal to be transmitted to the output signal of the narrow spectrum optical source for generating the optical signal, and to transmit the third optical signal to the multiplexer/demultiplexer device.

4. The communication system of claim 1, wherein for a broadcast communication from the one node to a plurality of the other nodes, the one node is adapted to generate the third optical signal at the wavelengths allocated to the other nodes.

5. The communication system of claim 4, wherein the one node comprises a broad spectrum optical source comprising the wavelengths allocated to the plurality of nodes, and wherein the one node is adapted to modulate the signal to be broadcast to the output signal of the broad spectrum optical source to generate the third optical signal, and to transmit the third optical signal to the multiplexer/demultiplexer device.

6. The communication system of claim 1, wherein
   the communication system is a wireless communication system,
   the plurality of nodes is adapted to provide a wireless communication with one or more wireless devices,
   the central node is a central switching node,
   the passive optical network forms the backhaul link between the central switching node and the nodes, and
   the signal to be transmitted directly between the nodes comprises X2 data.

7. An optical multiplexer/demultiplexer device for a communication system, the communication system comprising a plurality of nodes and a central node coupled via a passive optical network, the optical multiplexer/demultiplexer device comprising:
   a first plurality of input/output ports (I/O) comprising one I/O port and other I/O ports not including the one I/O port, wherein the one I/O port is adapted to be coupled to the central node;
   a second plurality of I/O ports, wherein individual I/O ports of the second plurality of I/O ports are adapted to be coupled to one of the nodes;
   wherein the multiplexer/demultiplexer device is adapted to demultiplex a first optical signal sent to the one I/O port from the central node to the nodes via the second plurality of I/O ports and to multiplex second optical signals sent to the second plurality of I/O ports from the nodes; and
   a passive optical coupler arranged for coupling the one I/O port to the other I/O ports, the passive optical coupler being adapted to combine third optical signals.

8. The optical multiplexer/demultiplexer device of claim 7, comprising an arrayed waveguide grating.

9. A method for directly transmitting signals between nodes of a communication system, the communication system comprising a plurality of nodes providing for communication with one or more devices, a central node, and a passive optical network comprising a multiplexer/demultiplexer device for demultiplexing a first optical signal from the central node to the plurality of nodes, and for multiplexing second optical signals from one or more of the nodes, each node allocated a wavelength, the multiplexer/demultiplexer device comprising a first plurality of input/output (I/O) ports comprising one I/O port and other I/O ports not including the one I/O port, wherein the one I/O port is coupled to the central node, and a second plurality of I/O ports wherein individual I/O ports of the second plurality of I/O ports are coupled to one of the nodes, the method comprising:

for directly transmitting signals from one node to at least one of the other nodes, generating at the one node a third optical signal at the wavelength allocated to the at least one of the other nodes; and combining the third optical signal from the one node with the first optical signal at the multiplexer/demultiplexer device, wherein combining the third optical signal from the one node with the first optical signal comprises:

applying the third optical signal to one of the second plurality of I/O ports of the multiplexer/demultiplexer device, the multiplexer/demultiplexer device providing the third optical signal at one of the other I/O ports; and coupling, by means of a passive optical coupler arranged between the one I/O port and the other I/O ports, the third optical signal.

10. A non-transitory storage medium that stores a computer program product comprising instructions for carrying out the method for directly transmitting signals between nodes of a communication system, the communication system comprising a plurality of nodes providing for communication with one or more devices, a central node, and a passive optical network comprising a multiplexer/demultiplexer device for demultiplexing a first optical signal from the central node to the plurality of nodes, and for multiplexing second optical signals from one or more of the nodes, each node allocated a wavelength, the multiplexer/demultiplexer device comprising a first plurality of (I/O) ports comprising one I/O port and other I/O ports not including the one I/O port, wherein the one I/O port is coupled to the central node, and a second plurality of I/O ports wherein individual I/O ports of the second plurality of I/O ports are coupled to one of the nodes, the method comprising:

for directly transmitting signals from one node to at least one of the other nodes, generating at the one node a third optical signal at the wavelength allocated to the at least one of the other nodes; and combining the third optical signal from the one node with the first optical signal at the multiplexer/demultiplexer device, when executing the instructions on a computer, wherein combining the third optical signal from the one node with the first optical signal comprises:

applying the third optical signal to one of the second plurality of I/O ports of the multiplexer/demultiplexer device, the multiplexer/demultiplexer device providing the third optical signal at one of the other I/O ports; and coupling, by means of a passive optical coupler arranged between the one I/O port and the other I/O ports, the third optical signal.

* * * * *